INVENTOR
THOMAS L. FLANAGAN
BY
ATTORNEY

United States Patent Office 3,511,497
Patented May 12, 1970

3,511,497
BELT CONVEYOR WITH PRESSURE DISTRIBUTION MEANS
Thomas L. Flanagan, Killingworth, Conn., assignor to Wagner Research Corporation, New York, N.Y.
Filed Jan. 23, 1968, Ser. No. 699,910
Int. Cl. B65h 29/16
U.S. Cl. 271—75                    6 Claims

ABSTRACT OF THE DISCLOSURE

A laterally slotted endless belt is driven by a toothed driving gear. The endless belt is positioned slightly above a work surface so as to contact the upper surface of a workpiece on the worksurface. The interior lamination of the endless belt is grooved longitudinally and a plurality of biased pressure distribution wheels are spaced along and ride in the longitudinal groove applying pressure along the portion of the belt adjacent to the worksurface. The pressure distribution wheels are individually biased and self regulating, according to the thickness of the workpiece.

---

The present invention relates to apparatus for conveying sheet material along or across a surface. In particular the present invention is an endless belt type conveyor means which has its principal use in conveying limp sheet material, such as sheets of cloth and/or fabric or cloth-like and/or fabric-like material, along a surface under controlled conditions.

In conveying sheets of limp material along or across a surface, sets of pairs of endless belts have been used in which the belts of a pair are positioned one above the other with the belts meeting substantially at the level of the surface over which the sheet material is conveyed. The sheet material is secured between the belts and the belts are rotated in opposite directions at the same speed thus conveying the secured sheet material along the surface between the belts.

The present belt conveyor apparatus employs a single overhead endless belt, as opposed to the belt pairs, to convey sheet material. The use of a single overhead endless belt makes use of differential friction between the belt and the sheet material, which is a high friction contact and the sheet material and surface, which is a low friction contact.

Overhead endless belts used for conveying limp sheet material in the manner described are flexible and, this characteristic normally includes the undesired characteristic of stretchability. In order to reduce the effects of stretching of the endless belts a plurality of relatively small belts are used to convey sheet material over a long distance.

The use of a plurality of belts to convey the same sheet of material, one after the other, presents the problem of rotating or driving adjacent belts at the same speed. In order to drive adjacent belts at the same speed, slippage between the drive gear and its belt need be eliminated. The problem of rotating or driving adjacent belts at the same speed, which includes the elimination of slippage between the driving gear and endless belt is overcome by using slotted belts with slotted or toothed driving gears. Such endless belts are sometimes referred to as "timing belts." The combination of a slotted belt and a mating toothed drive gear provides a positive meshing between the driving gear and belt thus eliminating slippage between the drive gear and the belt. By driving the drive gears at the same speed (assuming the drive gears are all the same size) adjacent (in line) belts will then be driven or rotated at the same speed.

It is most desirable to maintain differential friction at a substantially constant value along the length of the conveyor belt. This for preventing wrinkling of the sheet material under the belt caused by differences in differential friction as the sheet material is conveyed along the surface. This may be accomplished by maintaining the pressure between the belt and the surface substantially uniform and constant along the length of the belt. Pressure between the belt and the surface is maintained substantially uniform and constant by using a plurality of biased pressure wheels riding inside the endless belt and holding the belt against the surface over which the sheet material is conveyed. The conveyor belt is grooved on the interior surface so that the pressure wheels ride smoothly as the belt is rotated thus providing a plurality of pressure points along the belt driven over the surface thereby distributing pressure substantially uniformly along the belt even in the event of irregularities in the thickness of the belt and/or the sheet material and/or surface level irregularities.

The above features are combined in my improved conveyor means for transferring or conveying limp sheet material along or across a surface.

It is therefore, a principal object of the present invention to provide apparatus for maintaining essentially uniform distribution of pressure by that part of the endless belt effecting conveyance of limp sheet material along or across a surface.

Another object is to provide self adjusting pressure distribution apparatus for an endless belt conveyor system.

These and other objects will become more apparent from reading the following detailed description of the apparatus with reference to the accompanying drawings in which.

Figure 1:
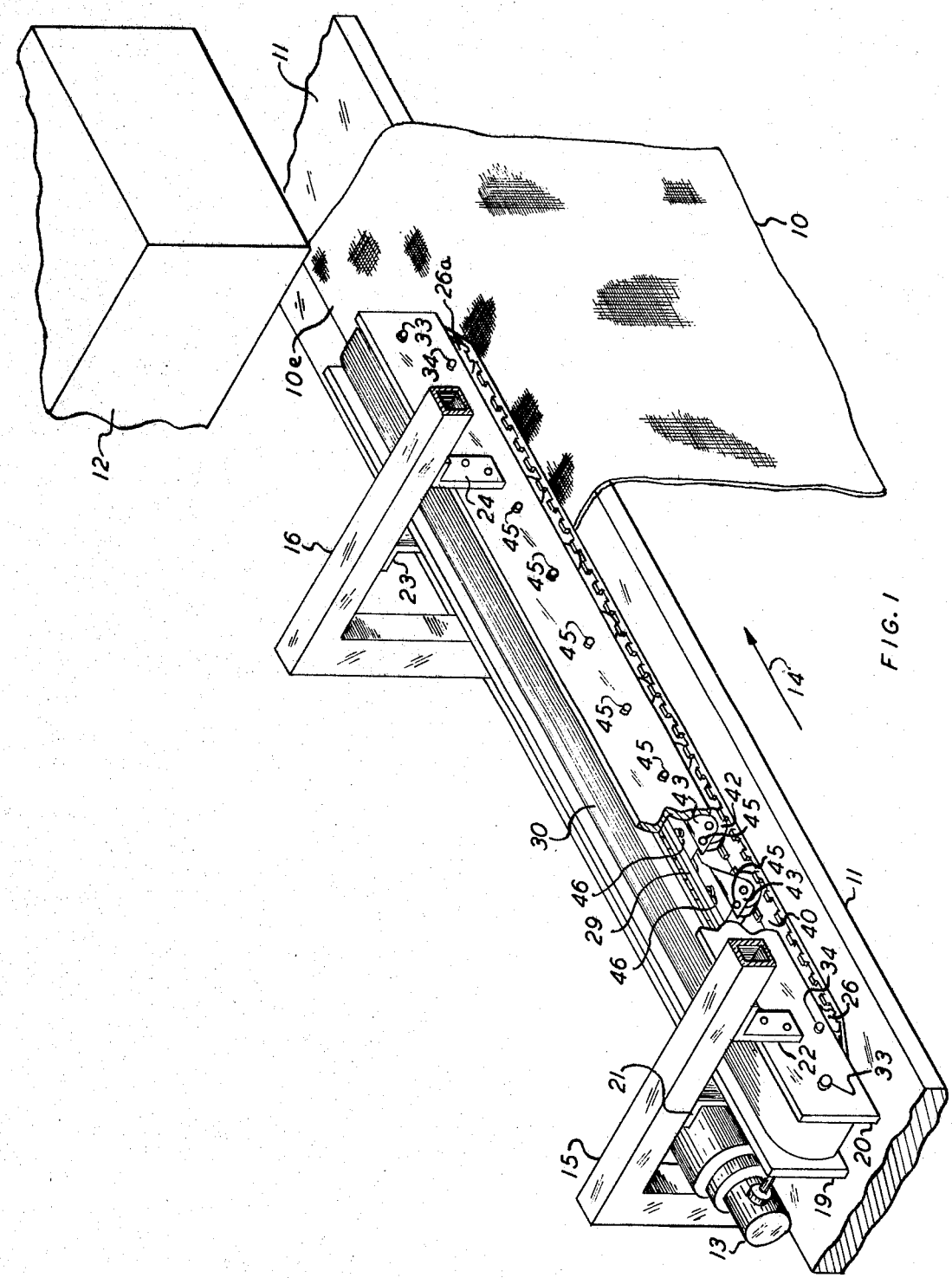
FIG. 1 illustrates one form of endless belt conveyor system employing a pressure distribution system.

Referring to FIG. 1 in more detail, a workpiece 10 is illustrated as being conveyed along a surface 11 toward a work station 12. The workpiece 10 may be a blank or piece of limp material such as cloth, for example and the work station 12 may be a sewing machine, for example. The work station 12 may also include a hem folded which folds the edge 10e of the workpiece 10 prior to being sewn. For the purpose of illustration, the workpiece 10 is presented as being relatively short in length, although such workpiece may be long in length. In addition, only one conveyor belt unit is illustrated although two or more conveyor belt units may be positioned in line along the work surface for conveying a workpiece along a long surface. Although the workpiece 10 is illustrated as draped or hanging it will be appreciated that a workpiece may be conveyed in flat condition, along a surface or work surface.

The work surface 11 may be a relatively flat, smooth surface having low friction characteristics with respect to the workpiece 10. The belt on the conveyor belt unit may be driven by a drive means represented by a motor 13 having a suitable gearing for driving a belt in a direction (in this example counterclockwise) for conveying or transferring the workpiece 10 in the direction of the arrow 14.

In general, the conveyor belt unit is suspended over the surface 11 by at least two arms 15 and 16. To each arm is coupled a pair of mounting plates 19 and 20 by brackets, such as 21 and 24 coupled to arm 15 and 23 and 24 coupled to arm 16.

The mounting plates 19 and 20 serve to support the axles of the drive gear 25 (driven by the motor 13), the lower belt positioning wheels 26 and 26a, the pressure distribution wheels and the pressure bar 29.

Figure 2:
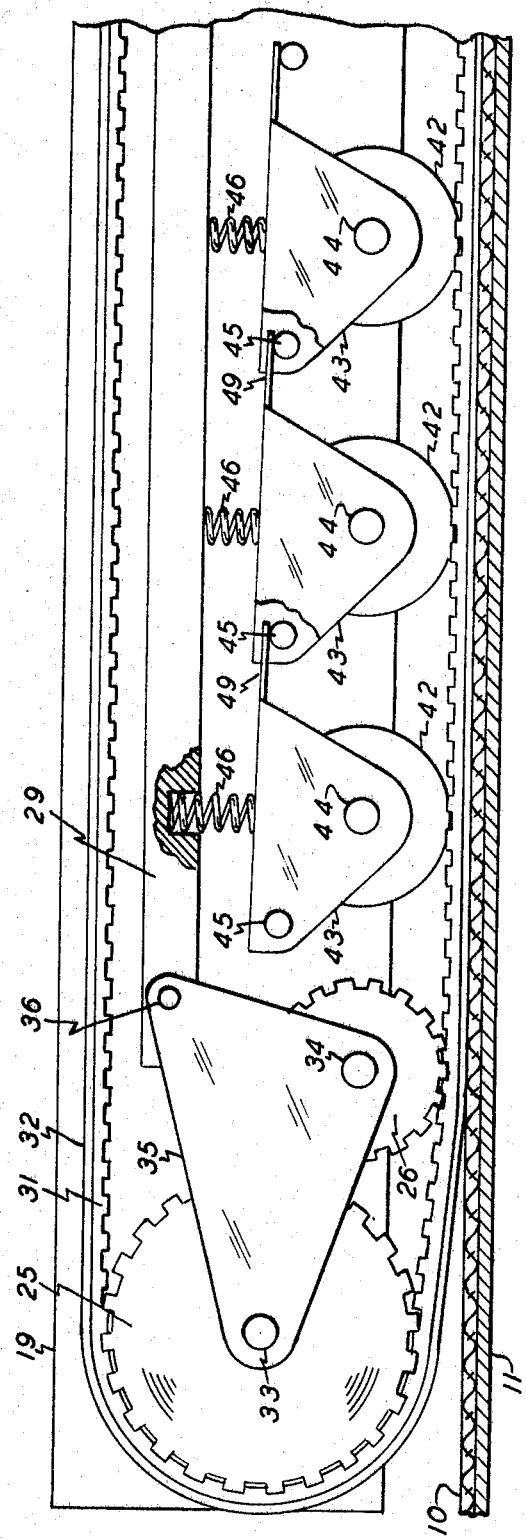
FIG. 2 illustrates pictorially the interior of part of the endless belt conveyor system shown in FIG. 1.

Referring also to FIG. 2, the endless belt 30 is illustrated as a laminated composition belt. The interior of the belt 31 may be a hard rubber composition which is grooved laterally, across the width thereof, essentially forming teeth on the inside of the belt. The interior is also grooved longitudinally, along the length thereof, forming a track in which the pressure distribution wheels ride. The exterior of the lamination 32 may be a sponge rubber which has high friction characteristics with respect to the sheet material blank or workpiece 10.

The drive gear 25 is keyed to the axle 33, which is mounted in bearings (not shown) set in the mounting plates 19 and 20. The axle 33 is rotated by the motor 13. The drive gear 25 is a toothed gear which meshes with the grooves in the interior lamination of the belt which provides a positive slip-proof drive for the endless belt 30.

It will be appreciated that as the belt 30 follows around the drive wheel 25 the exterior lamination 32 of the belt stretches, as compared with the interior lamination 31. It is desirable to permit the stretched exterior lamination to return to its normal physical condition (unstretched) before contacting the sheet material for conveyance. This avoids wrinkling of the workpiece as a result of the belt returning to an unstretched condition.

In order to prevent contact between the belt and the workpiece while the belt is in a stretched condition that part of the endless belt just breaking contact from the drive gear is held above a position of contact with the workpiece 10, and passes from the drive gear to a lower belt positioning wheel 26. The belt is permitted to return to a normal (unstretched) condition during that travel after breaking contact with the drive gear or wheel 25 and passing under the lower belt positioning wheel 26. In order to avoid additional stretching, the belt passes in a very shallow curve around wheel 26 into a position of contact with the workpiece 10 thus conveying the workpiece 10 along the surface 11 as the belt moves across the surface.

Since the exterior lamination 32 is of a substance which has high friction characteristics with respect to the workpiece material 10 and the surface 11 has low friction characteristics with respect to the workpiece material 10, the workpiece 10 is transferred along the surface with little or no resistance.

The lower belt positioning wheel 26 is held in position by its axle 34 which is mounted in the mounting plates 19 and 20. The position of the lower belt positioning wheel 26 essentially sets the mean position of the belt 30, with respect to the workpiece 10. If desired the wheel 26 may be adjustable with respect to its position above the surface 11. A pair of triangular mounting plates, of which only one, plate 35 is shown, may be supported on the axles 33 and 34 (one plate, on each side of the wheels 25 and 26). The triangular plates may be used to support the pressure bar 29, such as by means of a pin coupling 36.

The drive wheel end of the belt assembly having been described it will be appreciated that the other end, the idle wheel end, may be substantially the same, in construction except that the drive means at the idle wheel end would be eliminated. Also, if desired, that part corresponding to the lower belt positioning wheel (26a as shown) may be eliminated.

Figure 3:
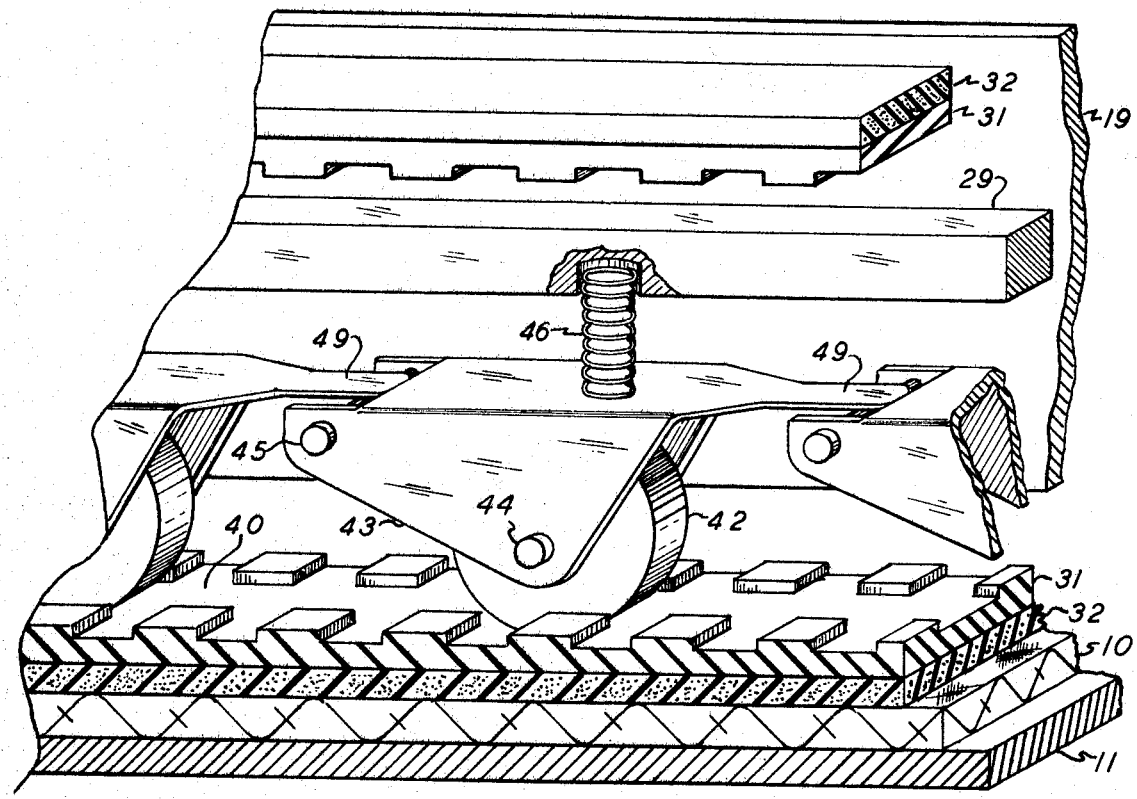
FIG. 3 illustrates in detail a pressure distribution wheel positioned inside the endless belt conveyor system.

The mounting plate 20 in FIG. 1 is shown cut away so that the longitudinal groove 40 in belt 30 and the position of the pressure distribution wheels may be shown. FIG. 3 shows the detail of the pressure distribution wheel while FIG. 2 shows the relative position of the pressure wheels with respect to adjacent pressure distribution wheels and the drive gear and belt positioning wheel.

It will be appreciated that the belt assembly includes a plurality of pressure distribution wheels, each mounted on its own axle and the axles mounted in the mounting plates 19 and 20. The pressure wheels are positioned inside the endless belt 30 so that the wheel rides in the interior longitudinal groove of the belt 30. Each pressure distribution wheel is independently biased and has limited vertical travel. The limit of the vercial travel (in its lowest position) may approximate the position of the lower belt positioning wheel 26, or may be slightly lower than the position of the belt positioning wheel.

The structure and mounting of each individual pressure distribution wheel assembly is substantially the same and a description of one such wheel assembly will be understood to essentially describe all the pressure distribution wheel assemblies.

Referring particularly to FIG. 3, a wheel 42 is mounted in a frame 43 by an axle 44, The wheel 42 has thickness and rides in the longitudinal groove 40 of the interior of the endless belt 30. The frame 43 is mounted pivotally on an axle 45 which axle is mounted in the mounting plates 19 and 20, suspended between such plates. The frame 43 is biased by a spring 46 which is recessed in the pressure bar 29 and urges the frame 43 and therefore the wheel 42, downwardly by applying pressure on the upper plate of the frame 43.

From the drawings it becomes clear that a plurality of pressure distribution wheels are spaced along the interior of the endless belt for providing distribution of pressure along the lower section of the endless belt, on to the surface 11. With this arrangement irregularities in thickness of the workpiece 10 may be tolerated. In addition, slight irregularities in the contour of the surface 11 may also be tolerated.

From the above it will be seen that an endless belt conveyor means has been provided with a means for distributing a substantially uniform and constant pressure along that portion of the conveyor means effectively transferring a workpiece along a surface. The present invention thus describes the scope the invention is defined by the appended claims.

I claim:
1. An endless belt conveyor system for conveying a sheet of limp material along a surface including:
   an endless belt mounted above said work surface and spaced therefrom for securing said sheet of limp material between said belt and said work surface,
   said belt being a slotted belt having slots across the width of the interior of said belt,
   means for rotating said belt for advancing said sheet of limp material secured between said belt and said surface along said surface, said means for rotating including
      a toothed gear adapted to mate into the slots of said belt and means for driving said toothed gear for rotating said belt,
      a longitudinal groove along the interior surface of said belt, and
      means positioned in said groove and biased for applying pressure on that part of said belt spaced from said work surface.
2. An endless belt conveyor system for conveying a sheet of limp material along a work surface including:
   an endless belt mounted above said work surface and spaced therefrom for securing said sheet of limp material between said belt and said work surface,
   means for rotating said belt for advancing said sheet of limp material secured between said belt and said surface along said surface,
   a longitudinal groove along the interior surface of said belt,
   means positioned in said groove and biased for applying pressure on that part of said belt spaced from said work surface,
   said means positioned in said groove including
      a frame pivotally mounted within the interior periphery of said belt,
      an axle mounted in said frame for supporting a wheel, a wheel mounted on said axle said wheel riding in said longitudinal groove, and means for biasing said frame arcuately toward said belt so spaced from said work surface.

3. An endless belt conveyor system for conveying limp sheet material along a surface including an endless belt composed of at least two materials having different resilient characteristics, said materials being laminated together, means for mounting said belt in a loop above said surface and spaced therefrom for contacting said sheet material between said belt and said surface, a drive gear and an idle gear mounted and disposed at the opposite ends of the loop, and a belt positioning gear mounted adjacent said drive gear and closer to said surface than said drive gear for positioning said belt with respect to said surface and for permitting the exterior lamination to unstretched after being stretched as the belt passes around said drive gear.

4. An endless belt conveyor system as in claim 3 and in which said endless belt is slotted laterally, said slots being substantially in the interior lamination and said drive gear is a toothed gear and the teeth on said toothed gear mate into the lateral slots in said belt for providing a non-slip drive system.

5. An endless belt conveyor system as in claim 4 and in which said endless belt is grooved longitudinally along the interior lamination thereof and said system further includes means positioned in said groove and biased for applying pressure on that part of said loop adjacent to said surface.

6. An endless belt conveyor system as in claim 5 and in which said means positioned in said groove includes a frame pivotally mounted within said loop, an axle mounted in said frame for supporting a wheel said axle pivotable about the mounting of said frame, a wheel mounted for rotating on said axle, said wheel riding in said longitudinal groove, a pressure bar disposed between said drive gear and said idle gear in said loop, and resilient means coupled between said pressure bar and said frame for urging said frame arcuately around said frame mounting toward said belt.

References Cited

UNITED STATES PATENTS 2,302,060  11/1942  Ryan _____ 271—45

EDWARD A. SROKA, Primary Examiner